(12) United States Patent
Wojciechowski

(10) Patent No.: US 11,767,871 B2
(45) Date of Patent: Sep. 26, 2023

(54) TABBED COLLAR FOR USE WITH LOCK BOLT

(71) Applicant: Arconic Inc., Pittsburgh, PA (US)

(72) Inventor: Stanley E. Wojciechowski, Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 16/734,633

(22) Filed: Jan. 6, 2020

(65) Prior Publication Data

US 2020/0141438 A1  May 7, 2020

Related U.S. Application Data

(63) Continuation of application No. PCT/US2018/041240, filed on Jul. 9, 2018.

(60) Provisional application No. 62/539,171, filed on Jul. 31, 2017.

(51) Int. Cl.
*F16B 19/05* (2006.01)
*F16B 5/02* (2006.01)

(52) U.S. Cl.
CPC ............... *F16B 19/05* (2013.01); *F16B 5/02* (2013.01)

(58) Field of Classification Search
CPC ........................................ F16B 19/05
USPC ................................. 411/361, 437
See application file for complete search history.

(56) References Cited

U.S. PATENT DOCUMENTS

| 3,295,404 | A | * | 1/1967 | Baker ................ F16B 19/05 411/361 |
| 4,813,834 | A | | 3/1989 | Smith |
| 4,867,625 | A | | 9/1989 | Dixon |
| 4,995,777 | A | * | 2/1991 | Warmington ........ F16B 19/05 411/361 |
| 6,233,802 | B1 | | 5/2001 | Fulbright |
| 6,325,582 | B1 | | 12/2001 | Sadri et al. |
| 7,293,339 | B2 | | 11/2007 | Mercer et al. |
| 8,727,685 | B2 | | 5/2014 | Corbett |
| 2007/0286703 | A1 | | 12/2007 | Doubler et al. |

FOREIGN PATENT DOCUMENTS

KR  10-2012-0107680 A  10/2012
KR  10-2015-0004617 A  1/2015

OTHER PUBLICATIONS

International Search Report and Written Opinion issued by the Korean Intellectual Property Office in international application No. PCT/US2018/041240 dated Nov. 16, 2018.

* cited by examiner

*Primary Examiner* — Flemming Saether
(74) *Attorney, Agent, or Firm* — Greenberg Traurig, LLP

(57) ABSTRACT

A lockbolt collar having a shank including a first end, a second end opposite the first end, a through-bore extending from the first end to the second end, an inner wall extending from the first end to the second end, and a tab extending radially and outwardly from the inner wall, the tab including a top surface having an arcuate shape, the arcuate shape of the tab being sized and shaped to mate with at least one lock groove of a threaded portion of a pin member.

13 Claims, 4 Drawing Sheets

TABBED COLLAR FOR USE WITH LOCK BOLT

CROSS-REFERENCE TO RELATED APPLICATION

This application is a continuation application relating to and claiming the benefit of commonly-owned, International Patent Application No. PCT/US2018/041240, filed Jul. 9, 2018, entitled "TABBED COLLAR FOR USE WITH LOCK BOLT", which relates to and claims the benefit of commonly-owned, U.S. Provisional Patent Application Ser. No. 62/539,171, filed Jul. 31, 2017, entitled "TABBED COLLAR FOR USE WITH LOCK BOLT," the entirety of each of which is incorporated by reference herein.

FIELD OF THE INVENTION

The present invention relates to fasteners and, more particularly, a fastener including a lock bolt collar having an inner tab adapted for engaging a lock bolt.

BACKGROUND OF THE INVENTION

Two-piece swaged fasteners, commonly referred to as lock bolts, are used to secure a plurality of work pieces together. Typically, swage-type fasteners include a pin member having a shaft with lock grooves and a lock bolt collar adapted to be swaged onto the lock grooves of the pin member by a fastener installation tool. The collar has a tubular shaped shank having an inner wall surrounding a through-bore which receives the shaft of the pin member during assembly and installation. The lock bolt collar may also have an internal tab which protrudes from the inner wall and extends partially into the through-bore. The tab serves to keep the lock bolt collar in position on the pin member after assembly and while awaiting installation by swaging. However, these tabs sometimes break prematurely during swaging of the lock bolt collar onto the pin member, which allows misalignment of the lock bolt collar on the pin member during swaging. Such misalignment may prevent the fastener from being installed or result in an installed fastener not having the full strength intended.

SUMMARY OF THE INVENTION

In an embodiment, a lockbolt collar includes a shank having a first end, a second end opposite the first end, a through-bore extending from the first end to the second end, an inner wall extending from the first end to the second end, and a tab extending radially and outwardly from the inner wall, the tab including a top surface having an arcuate shape. In an embodiment, the tab is positioned intermediate the first and second ends. In an embodiment, the tab is positioned proximate to the first end. In an embodiment, the collar further includes a flange located at the first end. In an embodiment, the tab is integral with the inner wall. In an embodiment, the tab is a separate component affixed to the inner wall.

In an embodiment, a fastener includes a pin member having an elongated shank portion including a threaded portion having at least one thread and at least one lock groove; and a lockbolt collar having a shank including a first end, a second end opposite the first end, a through-bore extending from the first end to the second end, an inner wall extending from the first end to the second end, and a tab extending outwardly from the inner wall, the tab including a top surface having an arcuate shape, the arcuate shape of the tab being sized and shaped to mate with the at least one lock groove of the threaded portion of the pin member. In an embodiment, the lock groove is helical. In an embodiment, the tab is positioned intermediate the first and second ends. In an embodiment, the tab is positioned proximate to the first end. In an embodiment, the lockbolt collar of the fastener further includes a flange located at the first end. In an embodiment, the tab is integral with the inner wall. In an embodiment, the tab is a separate component affixed to the inner wall. In an embodiment, the at least one lock groove includes a plurality of lock grooves.

In an embodiment, the tab is sized and shaped to maximize its area and volume, while still allowing it to be freely spun onto, and fit within, the lock grooves of the shaft of the pin member. More particularly, the size and shape of the tab allows for more cross-sectional area and/or volume of the tab to contact and engage with the helical lock groove, thus providing a higher strength against strip-off or break-off of the tab during swaging of the collar onto the shaft of the pin member.

DETAILED DESCRIPTION OF THE DRAWINGS

Figure 1:
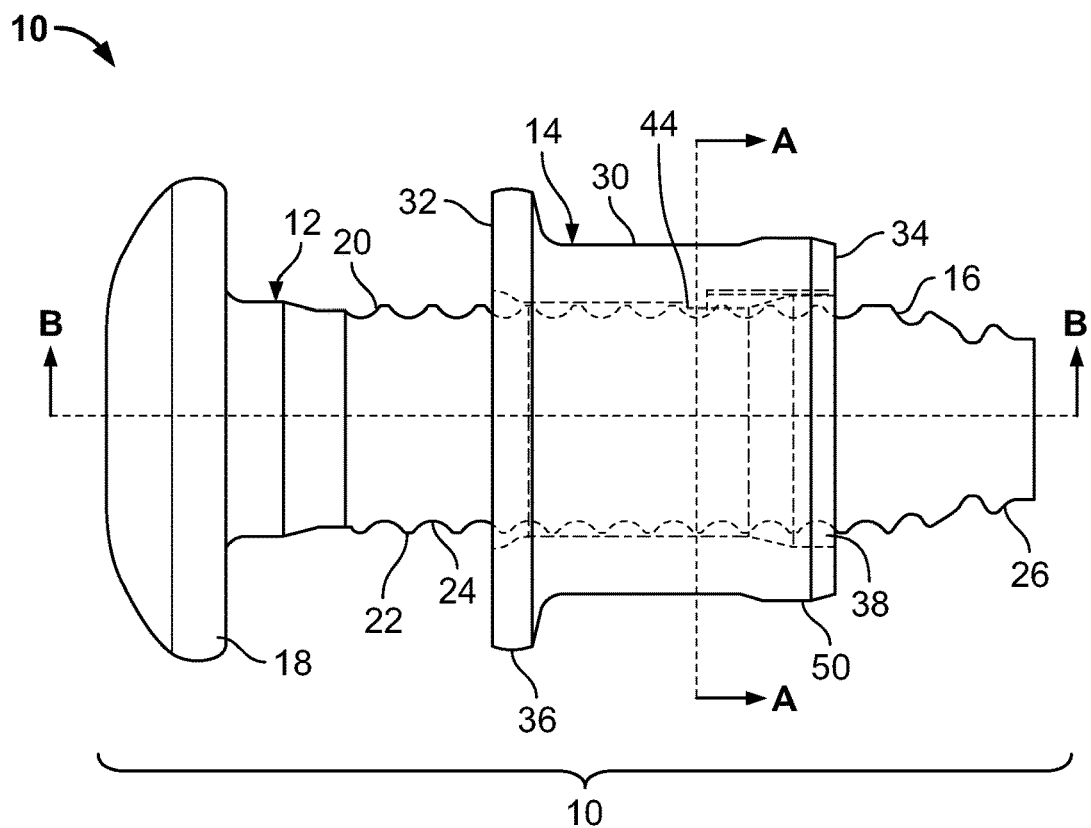
FIG. 1 is a side elevational view of a fastener in its assembled state, including a pin member and a lock bolt collar, constructed in accordance with an embodiment of the present invention.
Figure 3:
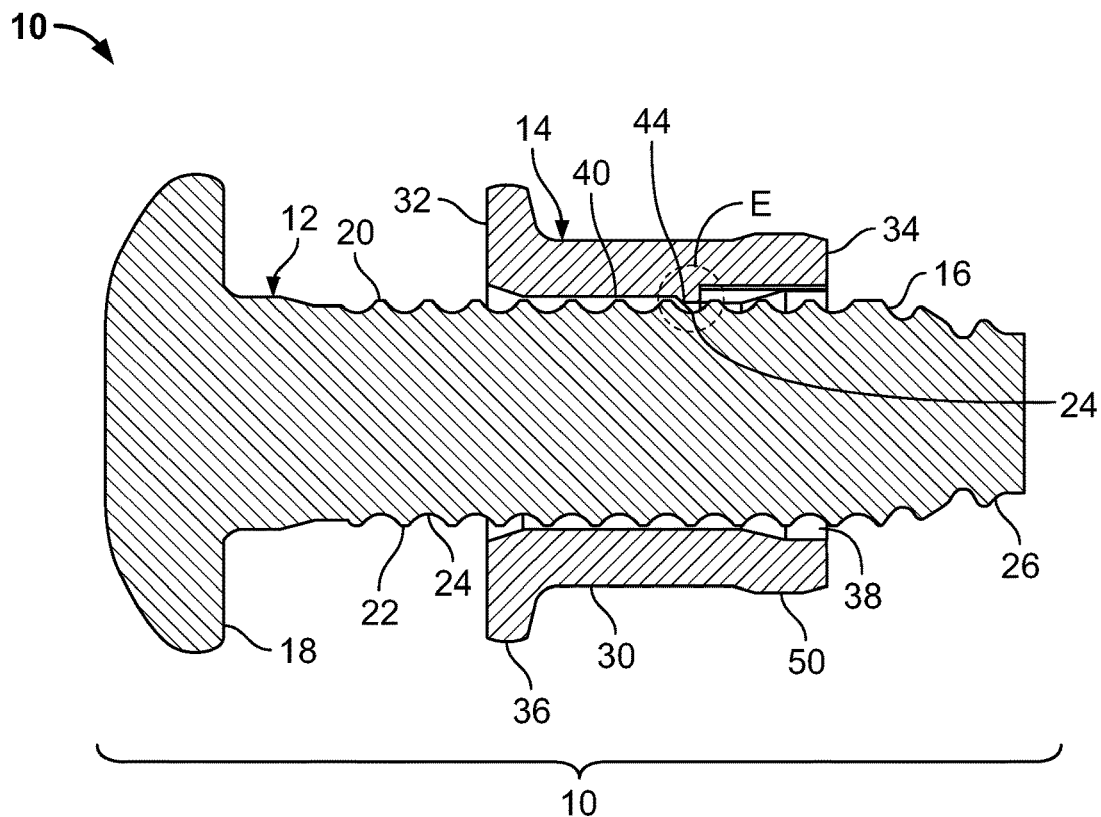
FIG. 3 is a side elevational cross-sectional view of the assembled fastener of FIG. 1, taken along line B-B and looking in the direction of the arrows.

Referring to FIGS. 1 and 3, in an embodiment, a fastener 10 includes a pin member 12 and a lock bolt collar 14 which is sized and shaped to mate with and be swaged onto the pin member 12. The pin member 12 and lock bolt collar 14 are shown in FIGS. 1 and 3 in their mated, assembled state, prior to swaging.

In an embodiment, the pin member 12 includes an elongated shaft portion 16 which terminates at one end in a head 18. In an embodiment, the shaft portion 16 includes a pintail portion 26 and a threaded portion 20 having one or more threads 22 with helical lock grooves 24. In an embodiment, the threaded portion 20 includes a single thread 22. In another embodiment, the pintail portion 26 includes a single groove. In another embodiment, the pintail portion 26 includes a plurality of grooves. In another embodiment, the pintail portion 26 includes at least one groove. In another embodiment, the pintail portion 26 includes an annular groove(s). In another embodiment, the pintail portion 26 includes a helical groove(s). In an embodiment, the pin member 12 is made from medium carbon alloy steel. In an embodiment, the pin member 12 is a Grade 9 (Class 12.9) strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art. In other embodiments, the pin member 12 can consist of any of the pin members as disclosed and described in U.S. Pat. No. 7,293,339 to Mercer et al. which is incorporated by reference herein.

With reference now to FIGS. 1, 3, 5-6 and 8, the lock bolt collar 14 includes a tubular-shaped shank 30 having a first end 32, a second end 34 opposite the first end 32, and a flange 36 extending circumferentially from and proximate to the first end 32. The lock bolt collar 14 also includes a through-bore 38 (see especially FIGS. 5, 6 and 8) which extends from the first end 32 to the second end 34 and forms an inner wall 40 of the collar 14. In FIG. 1, a section of the threaded portion 20 of the shaft 16 of the pin member 12 is shown in phantom because it is positioned within the through-bore 38 of the lock bolt collar 14 and, therefore, is not visible.

In an embodiment, the lock bolt collar 14 has a radial tab 44 protruding from the inner wall 40 and extending into the through-bore 38. The radial tab 44 may be integrally formed with the tubular-shaped shank 30 or may be a separate element formed independently from the tubular-shaped shank 30 and then affixed thereto, such as with adhesive or other suitable affixing means. In an embodiment, the radial tab 44 includes a radial top surface 46 with an arcuate shape (see, e.g., FIGS. 2 and 10). In an embodiment, the radial tab 44 is located intermediate the first and second ends 32, 34 of the shank 30 of the lock bolt collar 14. In an embodiment, the radial tab 44 is located proximate to the first end 32. In another embodiment, the radial tab 44 is located proximate to the second end 32. As shown in each of FIGS. 1 through 3, when the pin member 12 and the lock bolt collar 14 are assembled prior to swaging, the radial tab 44 is engaged within a helical lock groove 24 of the shaft 16 of the pin member 12. The radial tab 44 is sized and shaped to maximize its area and volume, while still allowing it to be freely spun onto and fit within the helical lock groove 24 of the shaft 16 of the pin member 12.

In an embodiment, the tubular-shaped shank 30 of the lock bolt collar 14 may further include a widened portion 50 located proximate to the second end 34 thereof. In an embodiment, the widened portion 50 has an outer diameter that is greater than the outer diameter of the main portion of the shank 30.

In an embodiment, the lock bolt collar 14 is made of low carbon steel. In another embodiment, the lock bolt collar 14 is made from unannealed low carbon steel. In another embodiment, the lock bolt collar 14 is made from annealed low carbon steel. In another embodiment, the lock bolt collar 14 is made from medium carbon boron steel, such as, for example, 10B22 steel. In another embodiment, the lock bolt collar 14 is made from medium carbon steel, such as, for example, 1038 steel. In another embodiment, the lock bolt collar 14 is "as-headed" and does not require thermal processing, as disclosed and described in aforesaid U.S. Pat. No. 7,293,339 to Mercer et al. As employed herein, the term "as-headed" refers to a collar which is strain hardened, for example, from cold working, rather than changing hardness using a thermal process (e.g., quench and tempering, stress relieving, etc.). In embodiment, the lock bolt collar 14 and the radial tab 44 are made from the same type of material. In an embodiment, the lock bolt collar 14 and the radial tab 44 are made from different materials. In an embodiment, the radial tab 44 is made of metal. In another embodiment, the radial tab 44 is made of rubber. In another embodiment, the radial tab 44 is made of plastic. In an embodiment, the radial tab 44 is made of nylon.

Figure 2:
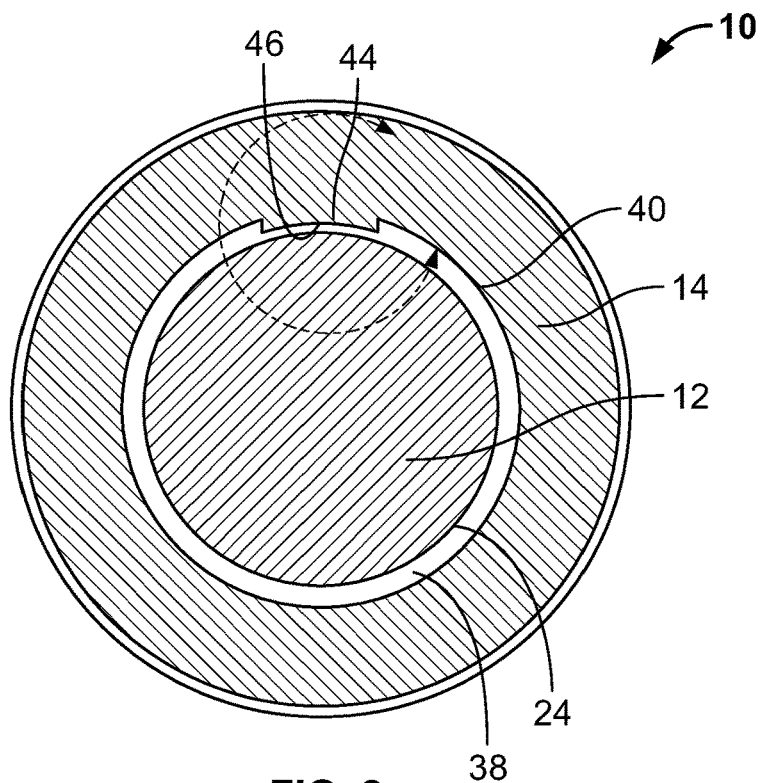
FIG. 2 is a cross-sectional view of the assembled fastener of FIG. 1, taken along line A-A and looking in the direction of the arrows.
Figure 4:
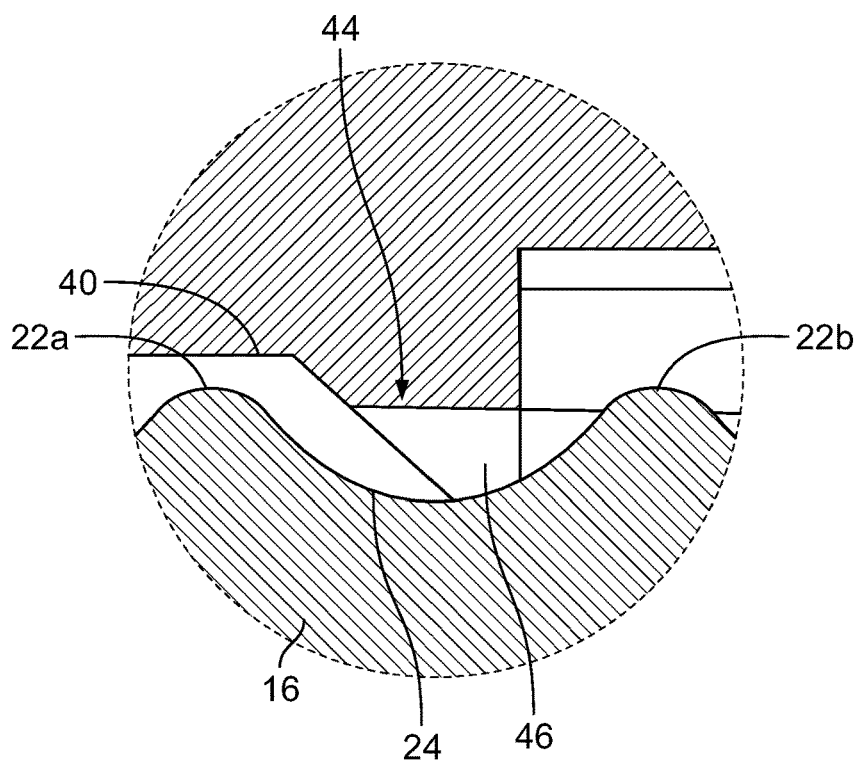
FIG. 4 is an enlargement of area E shown in FIG. 3 which shows the radial tab of the lock bolt collar engaged in a helical lock groove of the pin member.
Figure 5:
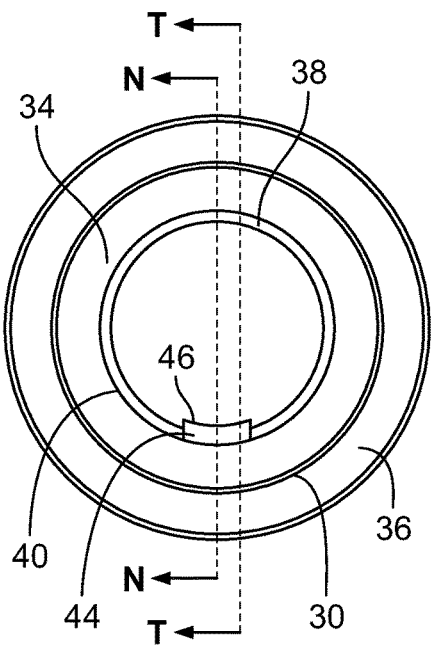
FIG. 5 is a top plan view of a lock bolt collar having a radial tab according to an embodiment of the present invention.

FIG. 2 provides a cross-sectional view of the assembled fastener of FIG. 1, taken along line A-A and looking in the direction of the arrows. As can be seen in this cross-sectional view, when the fastener 10 is assembled and prior to swaging, the radial tab 44 of the collar 14 is engaged in a helical lock groove 24 of the shaft 16 of the pin member 12. More particularly, as shown in FIG. 2, the radial top surface 46 of the radial tab 44 has an arcuate shape that conforms to the curve of the shaft 16 in the helical lock groove 24 such that, when the pin member 12 and lock bolt collar 14 are assembled, a greater portion of the radial tab 44 is inserted in the helical lock groove 24 and is in contact with the shaft 16 than in previous designs of tabbed lock bolt collars. FIG. 4 provides an enlargement of the area E indicated in FIG. 3, showing with the radial tab 44 engaged in a helical lock groove 24 between adjacent threads 22a, 22b.

Figure 6:
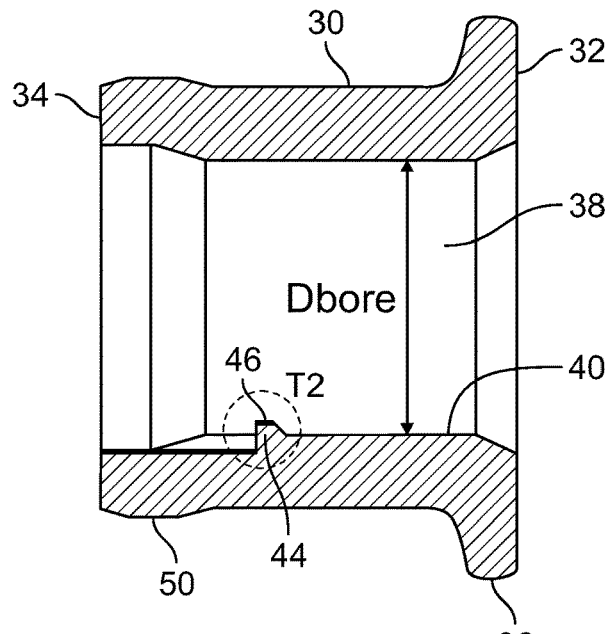
FIG. 6 is a cross-sectional side view of the lock bolt collar of FIG. 5 taken along line T-T and looking in the direction of the arrows.
Figure 7:
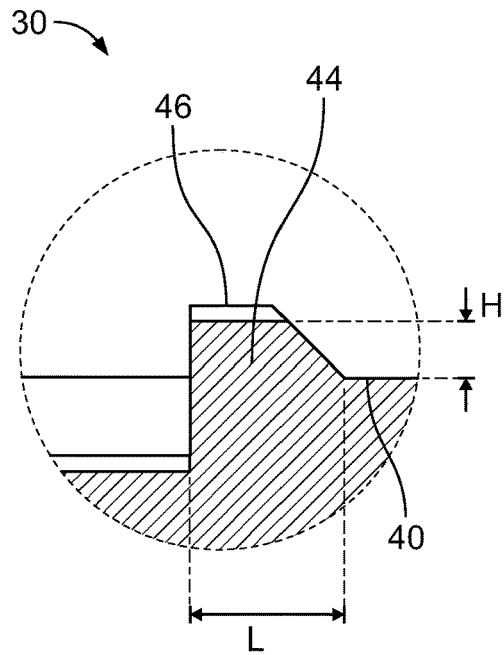
FIG. 7 is an enlargement of area T2 shown in FIG. 6 showing the radial tab.
Figure 8:
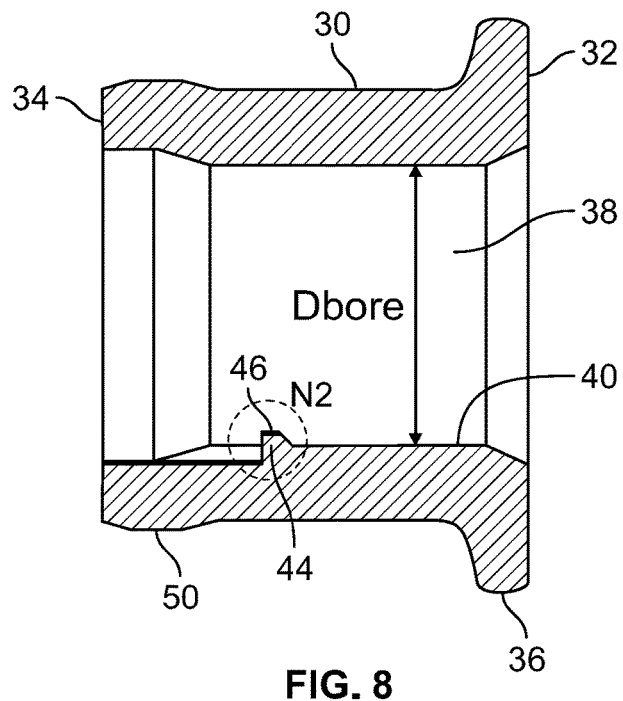
FIG. 8 is a cross-sectional side view of the lock bolt collar of FIG. 5 taken along line N-N and looking in the direction of the arrows.
Figure 9:
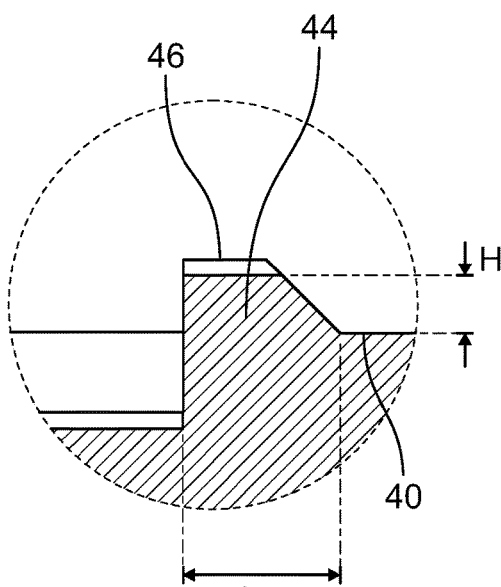
FIG. 9 is an enlargement of area N2 shown in FIG. 8 showing the radial tab.

In addition, with respect to the exemplary embodiment described herein, FIGS. 7 and 9 provide enlargements of sections T2 and N2 indicated in FIGS. 6 and 8, respectively, and show the radial tab 44 having a length L and a height H. For example, in an embodiment, with reference to FIG. 9, at the center of the radial tab 44 (i.e., where line N-N of FIG. 5 passes through the tab 44), the length L of the radial tab 44 is approximately 0.027 inch, and the height H (i.e., the distance between the inner wall 40 of the collar 14 and the radial top surface 46 of the radial tab 44) is approximately 0.009 inch. With reference to FIG. 7, in an embodiment, at an off-center position of the radial tab 44 (e.g., where line T-T of FIG. 5 passes through the tab 44), the length L of the radial tab 44 is approximately 0.025 inch, and the height H is approximately 0.009 inch. Thus, a consistent height H relative to the inner wall 40 is achieved by forming the radial tab 44 with the radial top surface 46 having an arcuate shape. It is noted that the aforesaid dimensions, i.e., length L and height H, of the radial tab 44 may vary based on overall size of the collar 14 and the particular materials of which it is made as will be understood by persons having ordinary skill in the relevant art.

Figure 10:
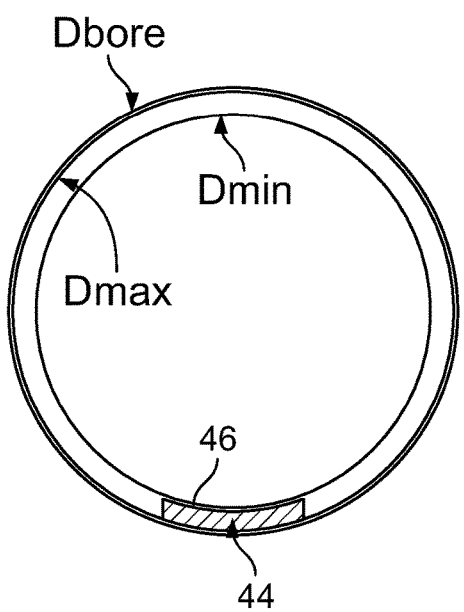
FIG. 10 is a schematic diagram showing the relative sizes of the root and major diameters of the helical lock grooves on the pin member and a radial tab of a lock bolt collar in accordance with an embodiment of the present invention, in their assembled state.

The size and shape of the radial tab 44 allows more cross-sectional area and/or volume of the radial tab 44 to contact and engage with the helical lock groove 24, thus providing a higher strength against strip-off or break-off of the radial tab 44 during swaging of the collar 14 onto the shaft 16 of the pin member 12. FIG. 10 provides guidance for the sizing of the radial tab 44 relative to the size of the threads 22 and helical lock grooves 24 of the threaded portion 20 of the shaft 16 of the pin member 12. The depth of each helical lock groove 24 is determined by the major diameter Dmax, which corresponds to the outermost diameter of the threads 22, and the root diameter Dmin, which corresponds to the innermost diameter of the helical lock groove 24. The major diameter Dmax is, of course, slightly less than the bore diameter Dbore of the through-bore 38 of the lock bolt collar 14, to enable the threaded portion 20 of the shaft 16 of the pin member 12 to fit closely but freely within the through-bore 38 of the collar 14. The radial tab 44 is formed having a radial top surface 46 having an arcuate shape that is sized to have a diameter slightly greater than the root diameter Dmin of the helical lock grooves 24. As shown in FIG. 10, a greater cross-sectional area (indicated by cross hatching in FIG. 10), i.e., about 27% greater than standard tabs, is provided by the radial tab 44 of the lock bolt collar 14 in accordance with the present invention.

Although not shown in the figures, the use of the fastener 10 to secure a plurality of workpieces together is generally known and understood by persons of ordinary skill in the relevant art. More particularly, the shaft 16 of the pin member 12 is inserted through aligned holes in two or more stacked work pieces (not shown in the Figures) until the head 18 of the pin member 12 engages one side of the stacked work pieces and the shaft 16 extends past the opposite side of the stacked workpieces. The lock bolt collar 14 is then assembled with the pin member 12 by passing the shaft 16 through the through-bore 38 and past the shank 30 of the collar 14 until the first end 32 and flange 36 of the collar 14 engage the opposite side of the stacked workpieces (not shown in Figures). In this assembled state, as discussed above, the radial tab 44 is seated in a helical lock groove 24 on the threaded portion 20 of the shaft 16 of the pin member 12 to hold the collar 14 on the pin member 12 while awaiting installation by swaging. After assembly of the fastener 10, an installation tool (not shown in the Figures) is used to grip the threads 22 on the shaft 16 and apply a relative axial swage load to the shank 30 of the collar 14, whereby the collar 14 is swaged onto the shaft 16 of the pin member 12.

It should be understood that the embodiments described herein are merely exemplary and that a person skilled in the art may make many variations and modifications without departing from the spirit and scope of the invention. All such variations and modifications are intended to be included within the scope of the claims.

What is claimed is:

1. A lockbolt collar, comprising:
    a shank having
        a first end,
        a second end opposite the first end,
        a through-bore extending from the first end to the second end,
        an inner wall extending from the first end to the second end, and
        a tab extending radially and inwardly from the inner wall,
            wherein the inner wall includes
                a first portion having a first inner diameter extending from the second end to the tab, and
                a second portion having a second inner diameter extending from the tab to a second location proximate to the first end, and wherein the tab includes:
                    a first surface extending inwardly from the first portion,
                        wherein the first surface is perpendicular to the first portion,
                        wherein the first surface extends perpendicular relative to a longitudinal axis of the lockbolt collar;
                    a second surface extending inwardly from the second portion,
                        wherein the second surface extends obliquely relative to the longitudinal axis of the lockbolt collar; and
                    a top surface extending from the first surface to the second surface,
                        wherein the top surface extends perpendicular to the first surface; and
                        wherein the top surface includes a concave arcuate shape.

2. The lockbolt collar of claim 1, wherein the tab is positioned intermediate the first and second ends.

3. The lockbolt collar of claim 2, further comprising a flange located at the first end.

4. The lockbolt collar of claim 1, wherein the tab is positioned proximate to the second end.

5. The lockbolt collar of claim 1, wherein the tab is integral with the inner wall.

6. The lockbolt collar of claim 1, wherein the tab is affixed to the inner wall.

7. A fastener, comprising:
    a pin member having an elongated shank portion including a threaded portion having at least one thread and at least one lock groove; and
    a lockbolt collar having
        a shank including
            a first end,
            a second end opposite the first end,
            a through-bore extending from the first end to the second end,
            an inner wall extending from the first end to the second end, and
            a tab extending radially and inwardly from the inner wall,
                wherein the inner wall includes
                    a first portion having a first inner diameter extending from the second end to the tab, and
                    a second portion having a second inner diameter extending from the tab to a second location proximate to the first end, wherein the tab includes:
                        a first surface extending inwardly from the first portion,
                            wherein the first surface is perpendicular to the first portion,
                            wherein the first surface extends perpendicular relative to a longitudinal axis of the lockbolt collar;
                        a second surface extending inwardly from the second portion,
                            wherein the second surface extends obliquely relative to the longitudinal axis of the lockbolt collar; and
                        a top surface extending from the first surface to the second surface,
                            wherein the top surface extends perpendicular to the first surface; and
                            wherein the top surface includes a concave arcuate shape, the arcuate shape of the tab being sized and shaped to mate with the at least one lock groove of the threaded portion of the pin member.

8. The fastener of claim 7, wherein the tab is positioned intermediate the first and second ends.

9. The fastener of claim 8, further comprising a flange located at the first end.

10. The fastener of claim 7, wherein the tab is positioned proximate to the second end.

11. The fastener of claim 7, wherein the tab is integral with the inner wall.

12. The fastener of claim 7, wherein the tab is affixed to the inner wall.

13. The fastener of claim 7, wherein the at least one lock groove includes a plurality of lock grooves.

* * * * *